Figure 1:
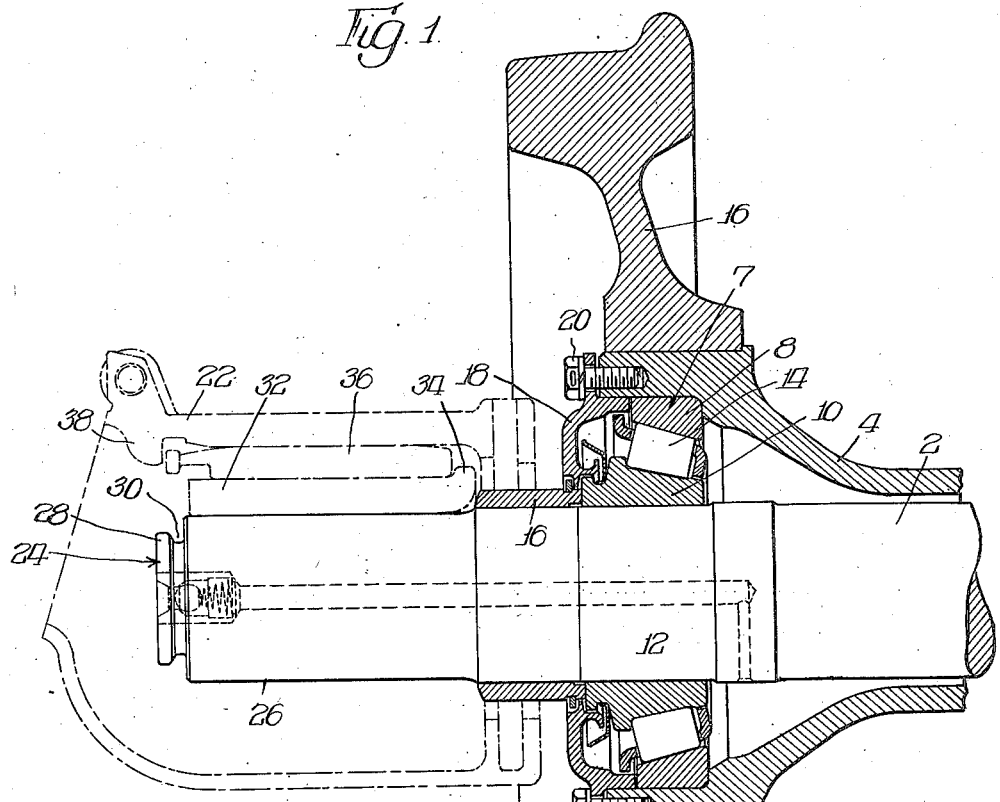

May 14, 1935.  W. C. HEDGCOCK  2,001,193

WHEEL AND AXLE ASSEMBLY

Filed July 27, 1931

Inventor
William C. Hedgcock,
By Wilkinson, Huxley, Byron & Knight
attys.

Patented May 14, 1935

2,001,193

UNITED STATES PATENT OFFICE 2,001,193

WHEEL AND AXLE ASSEMBLY

William C. Hedgcock, Wilmette, Ill., assignor to American Steel Foundries, Chicago, Ill., a corporation of New Jersey Application July 27, 1931, Serial No. 553,336

23 Claims. (Cl. 308—180)

The present invention relates to wheel and axle assemblies, and more in particular to a novel arrangement for direct transfer of lateral thrusts in one direction between elements thereof and a journal box associated therewith.

Among the objects of the present invention is to provide a novel wheel and axle assembly including roller bearing elements and having journal bearing members of journal boxes associated with the car axle, each journal box having unrestricted movement in one direction upon the axle, and limited movement in the opposite direction whereby lateral thrusts are directly transmitted in one direction from said roller bearing assembly to one of the journal boxes.

The invention comprehends the idea of providing a novel axle construction including means for engagement with a tool for adjusting the position of a roller bearing cone thereon, said means being so positioned as to permit unrestricted movement in one direction between the axle and a journal box bearing member associated therewith, whereby lateral thrusts are only transferred to the journal box in the opposite direction.

Another object of the invention is to provide a novel wheel and axle assembly including means for engagement with a tool for adjusting the position of a roller bearing cone fitting said axle, such means being so positioned as to permit unrestricted movement in one direction of a journal box bearing member associated with the axle and direct engagement with a retaining member for the cone in the opposite direction, whereby lateral thrusts are directly transferred in one direction from the roller bearing unit to the journal box.

A still further object of the invention is to provide a novel wheel and axle assembly in which a journal box bearing member associated with the axle and at the end thereof is free to move relative to the axle in one direction, restricted in the opposite direction by direct engagement with the retaining member of roller bearing elements mounted upon the axle, whereby lateral thrusts are directly transmitted from the roller bearing elements to the journal boxes and thus avoid any possibility of displacing said retaining member by such lateral thrusts.

With these and various other objects in view, the invention may consist of certain novel features of construction and operation as will be more fully described and particularly pointed out in the specification, drawing and claims appended hereto.

In the drawing, which illustrates an embodiment of the device and wherein like reference characters are used to designate like parts—

Figure 2:
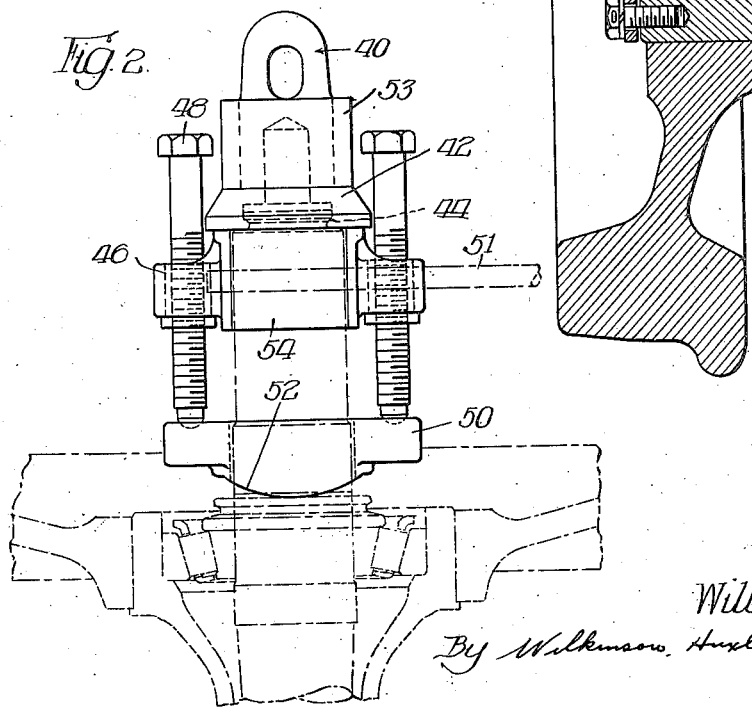

Figure 1 is a fragmentary view in cross section of a wheel and axle assembly embodying the present invention; and Figure 2 is a plan view of an adjusting tool for positioning the cone of a roller bearing unit, the same being shown in association with the wheel and axle assembly of Figure 1 of the drawing.

Referring now more in detail to the drawing, an embodiment of the present invention is shown in connection with a wheel and axle assembly, comprising an axle 2 enclosed or incased within an axle housing 4 having wheels 6 mounted upon each end thereof. Each end of the axle 2 is supported within the housing 4 by means of a roller bearing assembly 7 comprising a roller bearing cup 8 pressed within the end of the housing 4, and a roller bearing cone 10 pressed upon the enlarged hub portion 12 of the axle 2, roller bearings 14 being operatively supported between the roller bearing cup 8 and cone 10. The roller bearing cone 10 is adjustably fitted upon the enlarged portion 12 of the axle, after which a retaining member or collar 16 is shrunk or pressed upon the portion 12 for maintaining the cone 10 in its adjusted position. The roller bearing unit is enclosed within the axle housing 4 by a closure plate 18 secured thereto by means of cap screws 20, or the like, this closure member 18 fitting around the roller bearing cone and retaining member for providing a tight joint therebetween.

The invention contemplates the idea of providing a novel axle construction including means for receiving or anchoring a tool for adjustably positioning the cone 10 upon the axle portion 12, and to provide a construction wherein the lateral thrusts from the roller bearing assembly, which are transferred therefrom to the retaining member 16, cannot be transmitted to the journal box through said tool receiving or anchoring means but are only transmitted directly to the journal box 22 through abutment of the retaining member 16 against the journal bearing 32.

In this way the lateral thrusts are transmitted only through members directly under thrust load, including the said retaining member 16, so that there is no possibility of displacing the retaining member on the axle, and thus the retained position of the bearing elements, and the adjustment thereof, is not impaired. Such tool receiving or anchoring means comprises an adjusting collar 24 extending beyond the end of the journal portion 26 at each end of the axle 2. This adjusting collar is formed to provide a peripheral flange 28 spaced from the end of the axle 2 to provide an annular groove 30, this peripheral flange 28 being spaced radially and inwardly of the surface of the bearing portion 26.

During operation of the present wheel and axle assembly, lateral thrusts from the roller bearing unit are taken up by the retaining member 16. This retaining member or collar 16 is in turn adapted to abut with a journal bearing member 32, having movement restricted only for direct engagement with the collar 16, for direct transfer or transmittal of these lateral thrusts therebetween. This journal bearing 32 is provided with an upstanding flange or lug 34 adapted to engage the end of a journal wedge member 36 which in turn is adapted to engage with a lug 38 integral with the journal box 22.

It will be clearly seen that the journal bearing member 32 has free or unrestricted movement relative to the axle 2 except for direct engagement with the collar 16 for transfer of the lateral thrusts of the wheel and axle assembly to the journal box 22.

During the assembly of the roller bearing unit, an adjusting tool 40 may be used for adjustably positioning the roller bearing cone 10 on the axle 2. This adjusting tool 40 comprises a split anchoring portion 42 having an inwardly protruding lip or flange 44 adapted to be received in the groove 30 of the adjusting collar 24 and be engaged by the peripheral flange 28, the split portions 42 being held in embrace of the adjusting collar by the clamp ring 53. The tool also has the body portion 54 provided with opposite and outwardly extending lugs 46 provided with threaded openings engaging with the bolts 48 adapted to have pressing engagement with an adjusting collar 50 fitting over the axle 2, this collar 50 being provided with arcuate surfaces 52 adapted to engage with the cone 10. A rod or handle 51 is further provided and may be held to prevent rotation of the tool during the adjustment of the roller bearing cone 10. Movement inwardly of either one or both of the bolts 48 when the lip or flange 44 engages the peripheral flange 28 of the adjusting collar, forces the collar 50 and roller bearing cone 10 inwardly into the desired adjusted position.

It will be quite apparent from the above disclosure, together with the drawing, that the adjusting collar for receiving the adjusting tool 40 is spaced from the journal bearing member 32 and out of engagement therewith at all times, thereby permitting free and unrestricted movement thereof except for direct contacting engagement with the retaining collar 16, the lateral thrusts from the roller bearing unit being directly transferred therethrough and through the journal wedge member 36 to the journal box.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a bearing assembly, the combination of an axle having a journal portion, a roller bearing assembly adjacent said portion, and a journal bearing disposed on said journal portion, said axle and journal bearing having limited relative movement in opposite directions, the movement thereof being limited in one of said directions only through cooperation of said journal bearing and axle by engagement of said journal bearing with said roller bearing assembly.

2. In a bearing assembly, the combination of an axle having a journal portion, a roller bearing assembly adjacent said portion, said assembly including a race-ring mounted on said axle and having retaining means therefor, and a journal bearing disposed on said journal portion, said axle and journal bearing having limited relative movement in opposite directions, the movement thereof being limited in one of said directions only by engagement of said journal bearing with said retaining means.

3. In a bearing assembly, the combination of an axle having journal end portions, a roller bearing assembly adjacent each of said portions, and a journal bearing disposed on each of said journal portions, said axle and journal bearings having limited relative movement in opposite directions, the movement thereof being limited in one of said directions through cooperation of one of said journal bearings and axle only by engagement of said journal bearing with the adjacent roller bearing assembly and in the other of said directions through cooperation of the other of said journal bearings and axle only by engagement of said journal bearing and the adjacent roller bearing assembly.

4. In a wheel and axle assembly, the combination of an axle, a roller bearing assembly disposed adjacent an end of said axle, and a journal box assembly having a journal bearing disposed on the end of said axle, said journal box assembly having limited relative movement with said axle in opposite directions and cooperating with said axle for transferring lateral thrust through said roller bearing assembly in one direction only by engagement between said journal box and roller bearing assembly.

5. In a wheel and axle assembly, the combination of a car axle, roller bearing units mounted thereon, and journal box assemblies for said axle, each of said assemblies including a member having limited movement relative to said axle and abutting said units only for transmitting lateral thrusts between said boxes and units.

6. In a wheel and axle assembly, the combination of a car axle, roller bearing units mounted thereon, said units including a retaining member, and journal box assemblies for said axle, said assemblies including a member having limited movement relative to said axle and abutting said units only for transmitting lateral thrusts between said boxes and units.

7. In a wheel and axle assembly, the combination of a car axle, roller bearing units mounted thereon, said units including a retaining collar fitting said axle, and journal box assemblies for said axle, said assemblies including a member having limited movement relative to said axle and abutting said collar only for transmitting lateral thrusts between said boxes and units.

8. In a wheel and axle assembly, the combination of an axle, a roller bearing assembly disposed adjacent each end of said axle, and journal box assemblies each having a journal bearing disposed on an end of said axle, said journal box assemblies having limited relative movement with said axle in opposite directions, one of said journal box assemblies cooperating with said axle for transferring lateral thrusts through one of said roller bearing assemblies in one direction only by engagement between the journal bearing thereof and said roller bearing assembly and the other of said journal box assemblies cooperating with said axle for transferring lateral thrusts through the other of said roller bearing assemblies in the other direction only by engagement between the journal bearing thereof and the other of said roller bearing assemblies.

9. In a wheel and axle assembly, the combination of radially spaced axles, car wheels mounted on one of said axles, bearing units mounted between said axles, one of said axles extending laterally beyond said units, journal box assemblies for receiving said last-named axle, each of said assemblies including a journal bearing slidably supported upon said last-named axle for transfer of lateral thrust between the assemblies and said wheel and axle assembly said journal boxes and said wheel and axle assembly having limited relative lateral movement as units in either of two directions, one of said journal bearings engaging with one of said units only to transmit lateral thrust in one direction to said wheel and axle assembly and the other of said journal bearings engaging with the other of said units only to transmit lateral thrust in the opposite direction to said wheel and axle assembly.

10. In a wheel and axle assembly, the combination of radially spaced axles, car wheels mounted on one of said axles, bearing assemblies mounted between said axles, one of said axles extending laterally beyond said bearing assemblies, a retaining collar mounted on said last-named axle for holding said bearing assemblies in place, journal box assemblies for receiving said last-named axle, each of said assemblies including a journal bearing slidably supported upon said last-named axle for transfer of lateral thrust between the assemblies and said wheel and axle assembly, said journal boxes and said wheel and axle assembly having limited relative lateral movement as units in either of two directions, one of said journal bearings engaging with one of said retaining collars only to transmit lateral thrust in one direction to said wheel and axle assembly, and the other of said journal bearings engaging with the other of said retaining collars only to transmit lateral thrust in the opposite direction to said wheel and axle assembly.

11. In a wheel and axle assembly, the combination of radially spaced axles, roller bearing units mounted between said axles, journal box assemblies associated with one of said axles and having journal bearings slidably engaging with said last-named axle, said journal boxes and said wheel and axle assembly having limited relative lateral movement substantially as units in either of two directions, each of said journal bearings being directly engageable with one of said units only in the direction of movement of said journal boxes to transfer lateral thrust from a journal box to said wheel and axle assembly.

12. In a wheel and axle assembly, the combination of radially spaced axles, spaced roller bearing assemblies between said axles, journal box assemblies cooperating with the ends of the inner of said axles and having journal bearings slidably supported thereon, the journal bearings at one end of said inner axle engaging the roller bearing assembly at that end to transmit thereto lateral thrusts, the journal bearing and the roller bearing assembly at the opposite end of said wheel and axle assembly remaining free of said thrust.

13. In a roller bearing wheel and axle assembly, the combination of radially spaced axles, spaced roller bearing assemblies between said axles, journal box assemblies cooperating with the ends of the inner of said axles and having journal bearings slidably supported thereon, one of said journal bearings engaging with one of said roller bearing assemblies to transmit thereto lateral thrust in one direction only, and the other of said journal bearings engaging with the other of said roller bearing assemblies to transmit thereto lateral thrust in the opposite direction, one of said journal bearings being free of thrust with said wheel and axle assembly when the other of said journal bearings is in thrust engagement with a roller bearing assembly.

14. In a roller bearing wheel and axle assembly, the combination of an inner axle cooperating with journal boxes through friction bearings at its ends, anti-friction bearings including securing means therefor mounted on said inner axle, an outer axle rotatably mounted on said anti-friction bearings, said friction bearings being slidably movable on said inner axle to extend beyond the ends thereof but restricted inwardly by said securing means.

15. In a roller bearing wheel and axle assembly, the combination of an inner axle cooperating with journal boxes through friction bearings at its ends, anti-friction bearings including securing means therefor mounted on said inner axle, an outer axle rotatably mounted on said anti-friction bearings and having spaced wheels mounted thereon, said friction bearings being slidably movable on said inner axle to extend beyond the ends thereof but restricted inwardly by said securing means whereby lateral thrust from a journal box on one end of said wheel and axle assembly is transmitted through the friction bearing on said end, the anti-friction bearing on said end and the outer axle to the wheel on the other end of said wheel and axle assembly.

16. In a wheel and axle assembly, the combination of an inner and an outer axle, spaced bearing assemblies therebetween, journal box assemblies associated with said inner axle and each having a journal bearing slidably mounted thereon adjacent opposite ends thereof, said assemblies being adapted to transfer lateral thrusts in either of two directions, one of said journal bearings having engagement with an adjacent roller bearing assembly for transfer of thrust to said outer axle through said roller bearing assembly and the other of said journal bearings in the direction of said thrust being free from engagement for transfer of thrust with said wheel and axle.

17. In a wheel and axle assembly, the combination of an inner and an outer axle, spaced bearing assemblies therebetween, journal box assemblies associated with said inner axle and each having a journal bearing slidably mounted thereon adjacent opposite ends thereof, spaced wheels mounted on said outer axle and having flanges engageable with rails, said assemblies being adapted to transfer lateral thrusts in either of two directions, one of said journal bearings having engagement with an adjacent roller bearing assembly for transfer of thrust through said adjacent roller bearing assembly, outer axle and to an opposite rail through the flange of an opposite wheel and the other of said journal bearings in the direction of said thrust being free from engagement for transfer of thrust with said wheel and axle assembly.

18. In a roller bearing wheel and axle assembly, the combination of an inner axle, anti-friction bearing assemblies including securing means mounted on said inner axle, said axle having a collar on each end thereof for reception of an adjusting tool for said roller bearing assemblies, an outer axle mounted on said roller bearing assemblies and rotatable relative to said inner axle, said inner axle having journal portions co-operating with friction bearings slidably mounted thereon and adapted to extend beyond the ends thereof in spaced relation to said collars but restricted inwardly by said securing means.

19. In a wheel and axle assembly, the combination of a car axle, a roller bearing race-ring fitting said axle, said axle having said end provided with means for anchoring a tool for adjusting said race-ring, said means providing clearance with a bearing member slidably mounted on said axle to permit sliding thereof beyond the end of said axle.

20. In a wheel and axle assembly, the combination of a car axle, a roller bearing race-ring fitting said axle, said axle having a collar at the end thereof providing a groove for anchoring a tool for adjusting said race-ring, said collar being of a diameter to permit a bearing member slidably mounted on said axle to slide beyond the end of said axle.

21. In a wheel and axle assembly, the combination of a car axle, a roller bearing race-ring fitting said axle, said axle having a collar at the end thereof providing a groove for anchoring a tool for adjusting said race-ring, said collar being of less diameter than the axle cooperating with said bearing member to provide clearance with a bearing member slidably mounted on said axle to permit sliding thereof beyond the end of said axle.

22. In a roller bearing wheel and axle assembly, the combination of an inner axle cooperating with journal boxes through friction bearings at its ends, anti-friction bearings, including securing means therefor, mounted on said inner axle, a tubular axle rotatably mounted on said anti-friction bearings, said friction bearings being slidably movable on said inner axle to extend beyond the ends thereof, but restricted inwardly by said securing means, whereby lateral thrust from a journal box on one end of said wheel and axle assembly is transmitted through the friction bearing on said end, the anti-friction bearing on said end, and said tubular axle to the wheel on the other end of said wheel and axle assembly for transmission to a rail through the flange of said wheel.

23. In a roller bearing wheel and axle assembly, the combination of an inner axle cooperating with journal boxes through friction bearings at its ends, anti-friction bearings, including securing means therefor, mounted on said inner axle, a tubular axle rotatably mounted on said anti-friction bearings, said friction bearings being slidably movable on said inner axle to extend beyond the ends thereof, but restricted inwardly by said securing means, whereby lateral thrust from a journal box on one end of said wheel and axle assembly is transmitted through the friction bearing on said end, the anti-friction bearing on said end, and said tubular axle to the wheel on the other end of said wheel and axle assembly, while the anti-friction bearing on the other end of said wheel and axle assembly remains free of said thrust.

WILLIAM C. HEDGCOCK.